United States Patent [19]
Hishida

[11] Patent Number: 5,538,606
[45] Date of Patent: Jul. 23, 1996

[54] IONIZED WATER GENERATING DEVICE

[75] Inventor: Akio Hishida, Osaka, Japan

[73] Assignee: Taiki Japan Co., Ltd., Osaka, Japan

[21] Appl. No.: 340,211

[22] Filed: Nov. 16, 1994

[51] Int. Cl.$^6$ ............................................. C02F 1/461
[52] U.S. Cl. ................................................. 204/275
[58] Field of Search ............................. 204/269, 275

[56] References Cited

U.S. PATENT DOCUMENTS

| | | | |
|---|---|---|---|
| 5,314,589 | 5/1994 | Hawley | 204/275 X |
| 5,340,458 | 8/1994 | Koizumi | 204/275 X |
| 5,364,512 | 11/1994 | Earl | 204/275 X |

*Primary Examiner*—Donald R. Valentine
*Attorney, Agent, or Firm*—Lackenbach Siegel et al.

[57] ABSTRACT

The present invention provides an ionized water generating device enabling decreased manufacturing costs together with facilitating its mass production. Therefore, in the ionized water generating device generating ionized water by introducing tap water into a purifying block and an electrolyzing block installed in said device through a faucet, the device is characterized in that water channels connecting each of the functioning blocks are provided in an intermediate water channel block which is put together in one piece with a pair of plastic resin panels, and one of the panels is provided with a plurality of independent water passage respectively surrounded by shallow V-shaped grooves, and the other panel is provided with a plurality of V-shaped projections engaging with each of the V-shaped grooves to prevent leakage of water.

1 Claim, 4 Drawing Sheets

IONIZED WATER GENERATING DEVICE

BACKGROUND OF THE INVENTION

The present invention relates to an ionized water generating device which is provided with a purifying tank and an electrolyzing block.

Up to the present, tap water introduced into a main body of the conventional ionized water generating device was electrolyzed in an electrolyzing block provided with an anode and cathode for generating the direct current, after purification in a purifying tank, then divided electrolyzed into an alkali ion water and an acid ion water.

Furthermore, water channels connecting each functional block are individually connected with hoses, and, when assembling the water passages by using a plurality of water hoses, it is necessary to clamp both ends of the hoses which are connected by hand, requiring more manpower and more assembly work and time, so there are many drawbacks such as unsuitability for mass production and high production costs.

The present invention was developed in consideration of the above-mentioned drawbacks, and its object is to provide an ionized water generating device enabling reduced production costs and facilitating mass production of the device.

BRIEF DESCRIPTION OF THE INVENTION

To attain the above-mentioned objects, an ionized water generating device according to the present invention generating ionized water by introducing tap water into a purifying block and an electrolyzing block installed in the generating device through a faucet, is characterized in that water channels connecting each functional block are composed with an intermediate water channel block put together in one piece with a pair of panels made of resin, and one of the panels is provided with a plurality of deep grooves for providing water passages and with a plurality of shallow V-shaped grooves surrounding the deep grooves, and the other panel is provided with a plurality of V-shaped projections engaging with the V-shaped grooves provided on the first panel.

By adopting the above construction, as the water channel independently connecting each of the functional blocks in the ionized water generating device is composed with the intermediate water channel blocks which are put together with a pair of panels made of resin, it then becomes possible to considerably reduce production costs and facilitate the mass production of the ionized water generating device, particularly in comparison with the construction of the water channels adopting conventional water hoses.

DETAILED DESCRIPTION OF THE INVENTION

One embodiment according to the present invention is described with reference to the drawings as follows.

Figure 1:
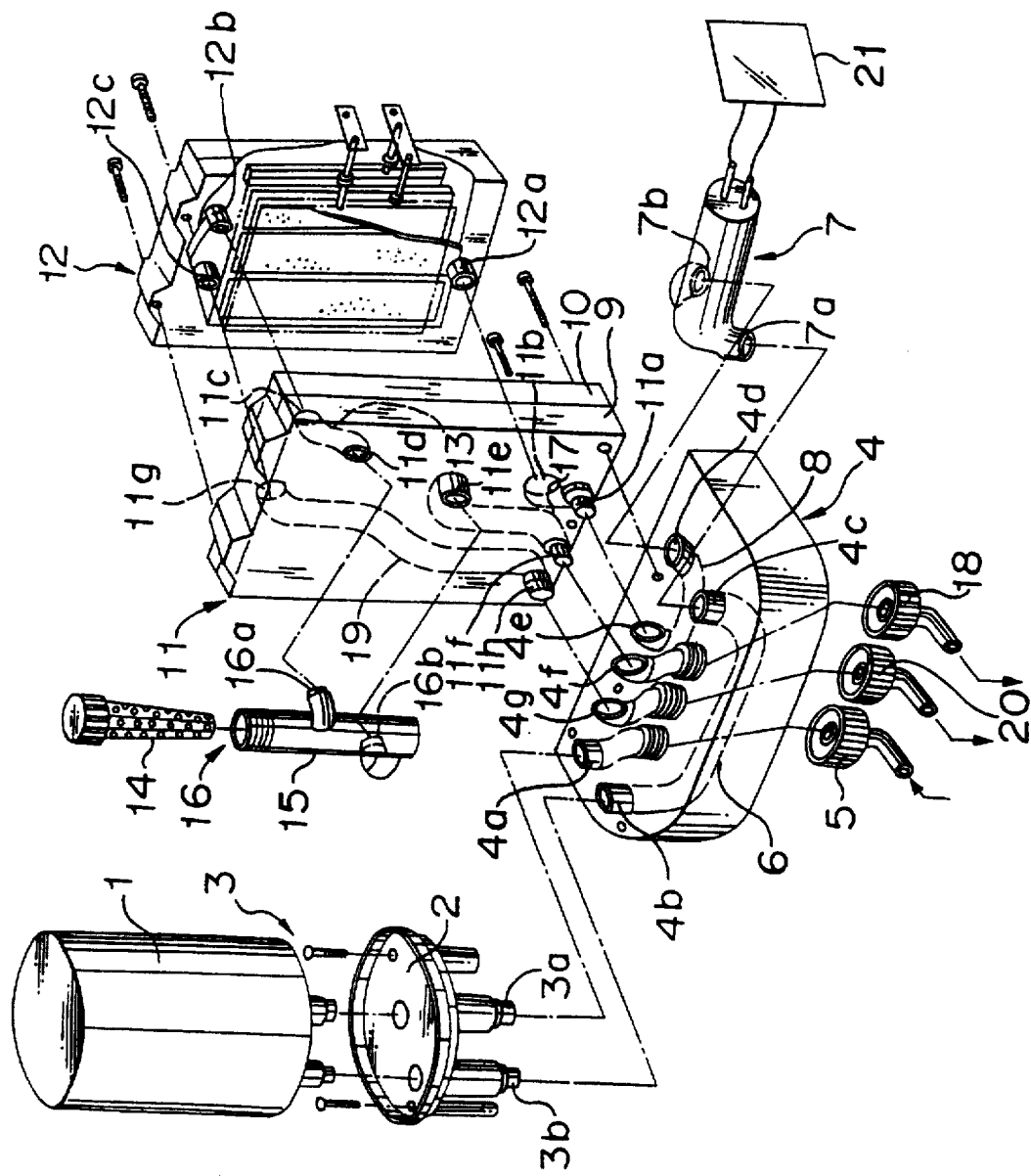
FIG. 1 shows an exploded perspective view of an embodiment according to the present invention.
Figure 2:
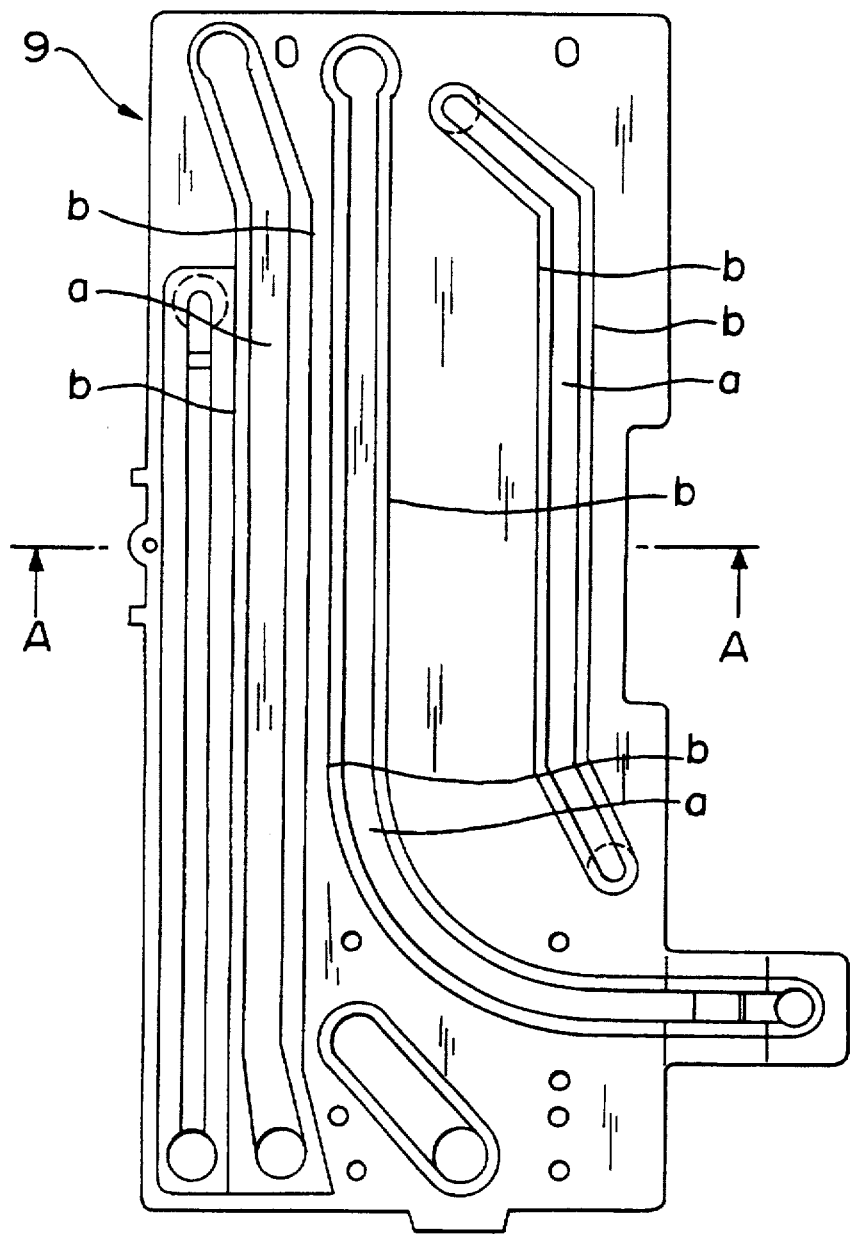
FIG. 2 shows a front view of one of the resin panels according to the present invention.
Figure 3:
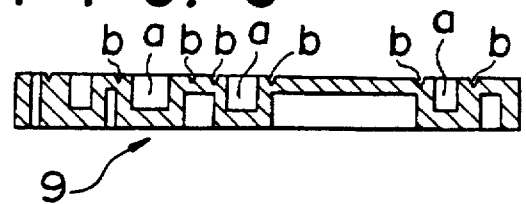
FIG. 3 shows a sectional view along line A—A shown in FIG. 2.
Figure 4:
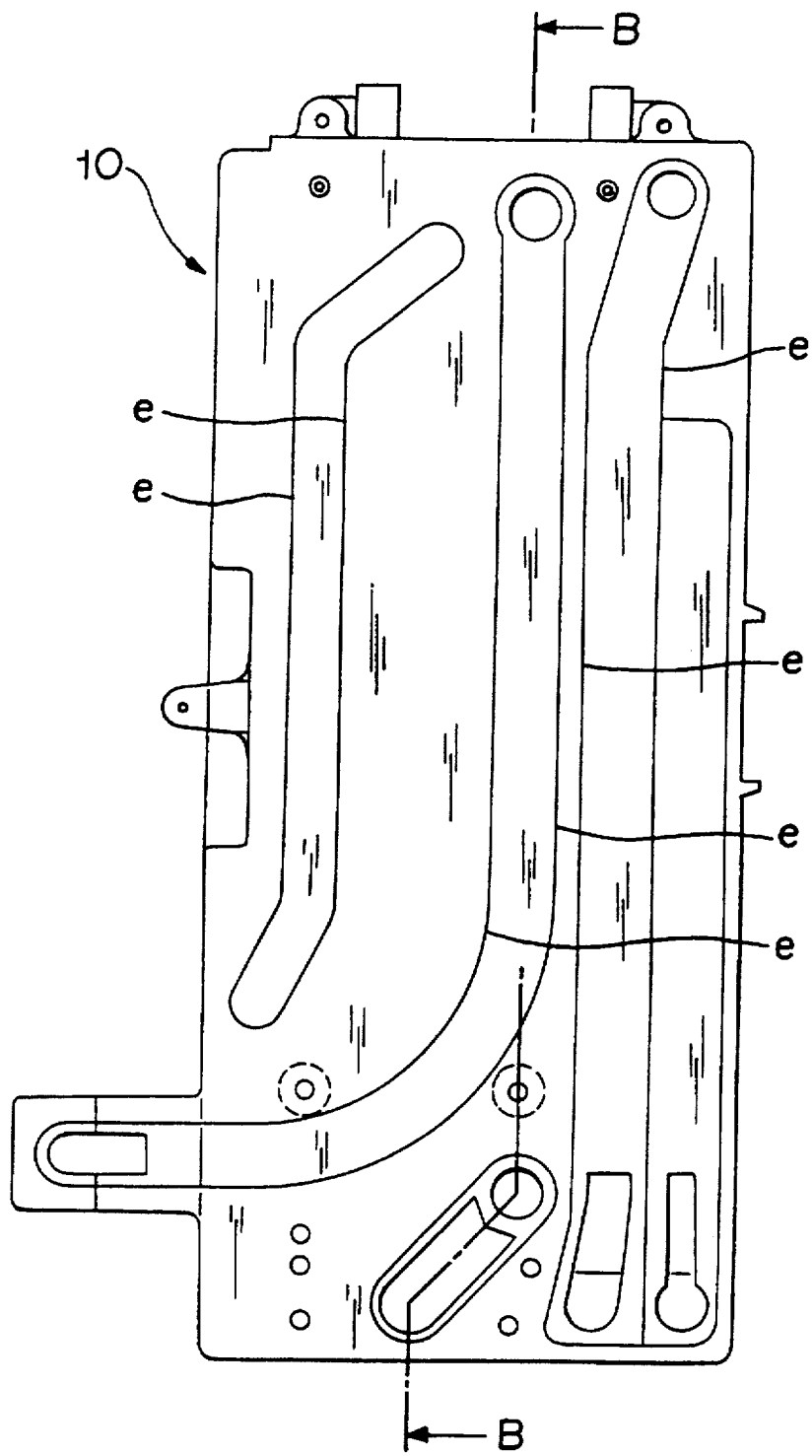
FIG. 4 shows a front view of another resin panel according to the present invention.
Figure 5:
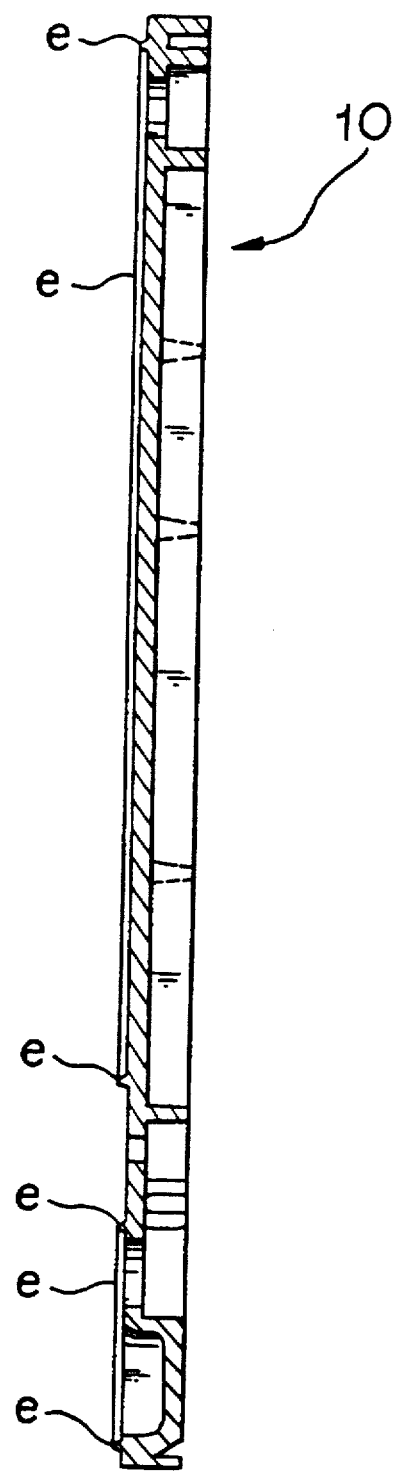
FIG. 5 shows a sectional view along line B—B shown in FIG. 4.

FIG. 1 is an exploded perspective view of an embodiment according to the present invention, FIG. 2 is a front view of one of the resin panels according to the present invention, FIG. 3 is a sectional view along line A—A shown in FIG. 2, FIG. 4 is a front view of other resin panel according to the present invention, and FIG. 5 is a sectional view along line B—B shown in FIG. 4.

As shown in FIG. 1, a purifying block 3 is composed with a cylinder packed with activated carbon 1 and a receiver of the activated carbon 2, and short pipes 3a and 3b extruded from the purifying block 3 are directly connected to short pipes 4a and 4b of a base water channel block 4 composed with three piled resin plates.

The short pipe 4a is connected to a water supply plug 5, and the short pipe 4b is connected to a short pipe 4c through a water passage 6 shaped in the base water channel block 4.

The short pipe 4c is directly connected to a short pipe 7a located at the inlet side of a pressure switch 7, and a short pipe 7b located at the exit side of the pressure switch 7 is directly connected to a short pipe 4d of the base water channel block 4.

The short pipe 4d is connected to a short pipe 4e through a water passage 8 in the base water channel block 4.

Further, the short pipe 4e is directly connected to a short pipe 11a of an intermediate water channel block 11 composed with a pair of resin panels 9 and 10 which are put together in one piece.

A hole 11b located on the exit side of the short pipe 11a is directly connected to a short pipe 12a of the electrolyzing block 12. And a short pipe 12b corresponding to the exit side of alkalized ionized water of the electrolyzing block 12 is directly connected to a hole 11d through a water passage 13 of the intermediate water channel block 11. Further, this hole 11d is directly connected to a short pipe 16a located on a calcium block 16 comprised with an inner calcium container 14 and an outer calcium receiving cylinder 15. A short pipe 16b located on the exit side of the calcium replenishing block 16 is directly connected to the hole 11e of the intermediate water channel block 11, and the hole 11e is connected to the short pipe 11f through a water passage 17 of the intermediate water channel 11. Furthermore, this short pipe 11f is directly connected to a short pipe 4f of the base water channel block 4, and a plug 18 discharging alkali ionized water is connected to a short pipe located on the exit side of the short pipe 4f.

On the other hand, a short pipe 12c corresponding with the exit side of acidified ionized water installed on the electrolyzing block 12 is directly connected to a hole 11g of the intermediate water channel block 11 and this hole 11g is connected to a short pipe 11h through a water passage 19 provided in the intermediate water channel block 11. Furthermore, this short pipe 11h is directly connected to a short pipe 4g on the base water channel block 4, and a plug 20 discharging acidified ionized water is connected to the short pipe located on the exit side of this short pipe 4g.

Direct connections of a pair of short pipes or one short pipe with a corresponding hole are made with thread fittings. Together with being provided with a step on each of the male short pipes, an O-ring is inserted around each of the male pipes being contacted to the step, and then it becomes possible to prevent leakage of water by pressing the O-ring to the step with the female short pipe or the edge of the hole.

Also, as the pressure switch 7 is activated by supplying tap water, when the pressure switch is activated, electrolyzation of tap water starts in the electrolyzing block by the activation of a controller 21. Furthermore, when the supply of tap water stops, the pressure switch 7 deactivates and the electrolyzing action in the electrolyzing block is also stopped by the action of the controller 21.

In the ionized water generating device, each of the aforementioned functional block and controller are installed in the main body of the device (not shown in the drawings).

The intermediate water channel block 11 corresponding to the main constructional element according to the present invention is next described in detail with reference to FIG. 2 to FIG. 5.

In one panel 9 of the intermediate water channel block 11 comprised with two panels 9 and 10 made of resin, a plurality of grooves (a) shaping each of the water passage and a plurality of V-shaped grooves around each of the grooves (a) are provided as shown in FIG. 2 and FIG. 3. In another panel 10, a plurality of V-shaped projections (e) engage with each of the V-shaped grooves shaped in the panel 9 as shown in FIG. 4 and FIG. 5.

As the height of the V-shaped projection (e) is higher than the depth of the V-shaped groove by as much as 0.5 mm, it is possible to prevent the leakage of water which flows in the water flow channel (a).

In this embodiment according to the present invention, as the water channels connecting each of the functional blocks in the ionized water generating device are not connected by applying hoses, and the intermediate water channel block 11 is constructed with two panels 9 and 10 made of resin, it becomes possible not only to decrease assembly work and assembly time, but also to decrease production costs and facilitate mass production of the device.

As detailed above, by applying the present invention, production costs, are drastically decreased and mass production considerably facilitated as compared with the construction of the water channels applying conventional connections with hoses, as the water channels connecting each of the functional blocks installed in the ionized water generating device of the invention are directly connected to each of the blocks by applying the intermediate water channel block composed of a plurality of panels made of resin place together in one piece.

What is claimed is:

1. An ionized water generating apparatus, comprising a purifying block for purifying water introduced therein by means of a water supply, and electrolyzing block for electrolyzing said water introduced therein from said purifying block, a switch for activating said electrolyzing block by sensing said water supply, an intermediate channel block having a first panel and a second panel both made of resin; said first panel being provided with a water passage from said purifying block to said electrolyzing block, an alkali ionized water passage means from said electrolyzing block to an alkali ionized water outlet, an acidified ionized water passage extending from said electrolyzing block to an acidified ionized water outlet, each of said passages being surrounded by a shallow v-shape grove, and said second panel being provided with a plurality of v-shaped projections each of which engages a corresponding one of said v-shape grove.

\* \* \* \* \*